(12) United States Patent
Bejerano et al.

(10) Patent No.: US 9,402,003 B2
(45) Date of Patent: Jul. 26, 2016

(54) DATA ALLOCATION FOR PRE-PAID GROUP DATA PLANS

(71) Applicant: Alcatel-Lucent USA Inc., Murray Hill, NJ (US)

(72) Inventors: Yigal Bejerano, Springfield, NJ (US); Daniel M. Andrews, Chatham, NJ (US); Pramod V. Koppol, Manalapan, NJ (US)

(73) Assignee: Alcatel-Lucent, Boulogne-Billancourt (FR)

( * ) Notice: Subject to any disclaimer, the term of this patent is extended or adjusted under 35 U.S.C. 154(b) by 113 days.

(21) Appl. No.: 14/247,470

(22) Filed: Apr. 8, 2014

(65) Prior Publication Data

US 2015/0288827 A1 Oct. 8, 2015

(51) Int. Cl.
*H04M 15/00* (2006.01)
*H04M 17/00* (2006.01)
*H04L 12/14* (2006.01)

(52) U.S. Cl.
CPC .............. *H04M 15/83* (2013.01); *H04L 12/14* (2013.01); *H04M 15/765* (2013.01); *H04M 15/7652* (2013.01); *H04M 15/852* (2013.01); *H04M 15/853* (2013.01); *H04M 15/854* (2013.01); *H04M 15/88* (2013.01); *H04M 15/881* (2013.01); *H04M 15/886* (2013.01); *H04M 17/10* (2013.01); *H04M 15/46* (2013.01); *H04M 15/86* (2013.01)

(58) Field of Classification Search
None
See application file for complete search history.

(56) References Cited

U.S. PATENT DOCUMENTS

| | | | | |
|---|---|---|---|---|
| 6,115,613 A * | 9/2000 | Jonsson | .................. | H04W 4/24 455/414.1 |
| 7,603,103 B1 * | 10/2009 | Mau | ...................... | G06Q 20/102 379/132 |
| 2008/0119162 A1 * | 5/2008 | Sivalingam | ......... | H04M 15/751 455/408 |
| 2011/0191826 A1 * | 8/2011 | Ballal | .................... | H04L 63/104 726/4 |
| 2012/0246291 A1 | 9/2012 | Wong et al. | | |
| 2012/0317266 A1 | 12/2012 | Abbott | | |
| 2013/0054378 A1 | 2/2013 | Hao et al. | | |
| 2013/0109357 A1 | 5/2013 | Ganatra et al. | | |
| 2013/0132854 A1 * | 5/2013 | Raleigh | ................. | G06F 3/0482 715/738 |
| 2013/0149994 A1 * | 6/2013 | Gaddam | ............... | H04L 41/069 455/406 |

FOREIGN PATENT DOCUMENTS

EP   1372331 A2   12/2003

* cited by examiner

*Primary Examiner* — Daniel Lai
(74) *Attorney, Agent, or Firm* — Harness, Dickey & Pierce, P.L.C.

(57) ABSTRACT

In one example embodiment, a group server includes a processor configured to receive a data quota usage report corresponding to data quota usage by at least one of a plurality of lines, the plurality of lines forming a group subject to a pre-paid data usage agreement with a data service provider and determine a data quota for the at least one of the plurality of lines based on at least the received data quota usage report and an accuracy threshold.

18 Claims, 3 Drawing Sheets

DATA ALLOCATION FOR PRE-PAID GROUP DATA PLANS

BACKGROUND

Group data plans are becoming the preferred method for service providers to offer wireless data services to a group of users (families, business entities, etc.). In a group plan, multiple devices (or "lines") share a common data quota, which may also be referred to as the group data quota.

In postpaid data plans, a group of lines (e.g., a subscriber) pays a monthly fee and receives a data quota that may be used by all the lines in the group within a month. However, in prepaid data plans, a data quota is purchased up front and may be increased by a group representative any time the quota gets low. However, real-time estimation and reporting of data quota usage by groups subject to prepaid agreements may be beneficial to providers of prepaid plans as providers seek to minimize their loss of revenue due to inaccurate estimation of data quota usage by groups of users subject to pre-paid data plans.

SUMMARY

Some example embodiments relate to methods and/or apparatuses to allocate data quota to a group of lines subject to a pre-paid agreement with a data service provider.

In one example embodiment, a group server includes a processor configured to receive a data quota usage report corresponding to data quota usage by at least one of a plurality of lines, the plurality of lines forming a group subject to a pre-paid data usage agreement with a data service provider and determine a data quota for the at least one of the plurality of lines based on at least the received data quota usage report and an accuracy threshold.

In yet another example embodiment, the processor is further configured to report at least one of a line specific balance to the at least one of the plurality of lines, the line specific balance being at least one of an unused portion of the data quota determined for the at least one of the plurality of lines and data quota consumed by the at least one of the plurality of lines, and a group quota balance to the at least one of the plurality of lines, the group quota balance being at least one of an unused portion of a group data quota associated with the group and data quota consumed by the group.

In yet another example embodiment, the processor is further configured to provide an indication of a continuing data quota usage by the at least one of the plurality of lines to one or more of the plurality of lines of the group.

In yet another example embodiment, the processor is further configured to block data usage by the plurality of lines when a total data quota usage associated with the group exceeds an allowed data quota for the group, and report the block of the data usage to the plurality of lines.

In yet another example embodiment, the processor is further configured to determine the data quota based on the received data quota usage report, the accuracy threshold and a rate of consumption of data quota by the at least one of the plurality of lines.

In yet another example embodiment, the processor is further configured to estimate the rate of consumption based on at least one of a real-time rate of consumption of data quota associated with the at least one of the plurality of lines or an average rate of consumption of data quota associated with the at least one of the plurality of lines.

In yet another example embodiment, the processor is further configured to determine a sum of data quotas allocated to the plurality of lines, determine whether the determined sum has exceeded a balance threshold and determine a new data quota for the plurality of lines if the determined sum has exceeded the balance threshold.

In yet another example embodiment, the processor is configured to determine the data quota for the at least one of the plurality of lines based on the received data quota usage report, the accuracy threshold and a minimum new data quota.

In yet another example embodiment, the processor is further configured to determine the accuracy threshold to be at least one of a volume-based accuracy threshold and a time-based accuracy threshold, wherein the volume-based accuracy threshold indicates an accuracy range associated with a reported data quota usage by the group and the time-based accuracy threshold indicates a time period for which the reported data quota usage by the group is accurate.

In yet another example embodiment, the group is subjected to multiple pre-paid data usage agreements and the processor is configured to prioritize the multiple pre-paid data usage agreements based on at least one of an expiration of each of the multiple pre-paid data usage agreements and a promotion associated with each of the multiple pre-paid data usage agreements.

In one example embodiment, a method includes receiving, by a processor, a data quota usage report corresponding to data quota usage by at least one of a plurality of lines, the plurality of lines forming a group subject to a pre-paid data usage agreement with a data service provider and determining, by the processor, a data quota for the at least one of the plurality of lines based on at least the received data quota usage report and an accuracy threshold.

In yet another example embodiment, the method further includes at least one of reporting a line specific balance to the at least one of the plurality of lines, the line specific balance being at least one of an unused portion of the data quota determined for the at least one of the plurality of lines and data quota consumed by the at least one of the plurality of lines, and reporting a group balance to the at least one of the plurality of lines, the group balance being at least one of an unused portion of a group data quota associated with the group and data quota consumed by the group.

In yet another example embodiment, the reporting provides an indication of a continuing data quota usage by the at least one of the plurality of lines to one or more of the plurality of lines of the group.

In yet another example embodiment, the method further includes blocking data usage by the plurality of lines when a total data quota usage associated with the group exceeds an allowed data quota for the group and reporting the blocking of the data usage to the plurality of lines.

In yet another example embodiment, the determining determines the data quota based on the received data quota usage report, the accuracy threshold and a rate of consumption of data quota by the at least one of the plurality of lines.

In yet another example embodiment, the method further includes estimating the rate of consumption based on at least one of a real-time rate of consumption of data quota associated with the at least one of the plurality of lines or an average rate of consumption of data quota associated with the at least one of the plurality of lines.

In yet another example embodiment, the method further includes determining a sum of outstanding data quotas allocated to the plurality of lines, determining whether the determined sum has exceeded a balance threshold and determining a new data quota for the plurality of lines if the determined sum has exceeded the balance threshold.

In yet another example embodiment, the determining determines the data quota for the at least one of the plurality of lines based on the received data quota usage report, the accuracy threshold and a minimum new data quota.

In yet another example embodiment, the method further includes determining the accuracy threshold to be at least one of a volume-based accuracy threshold and a time-based accuracy threshold, wherein the volume-based accuracy threshold indicates an accuracy range associated with a reported data quota usage by the group and the time-based accuracy threshold indicates a time period for which the reported data quota usage by the group is accurate.

In yet another example embodiment, upon the group being subjected to multiple pre-paid data usage agreements, the method further includes prioritizing the multiple pre-paid data usage agreements based on at least one of an expiration of each of the multiple pre-paid data usage agreements and a promotion associated with each of the multiple pre-paid data usage agreements.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
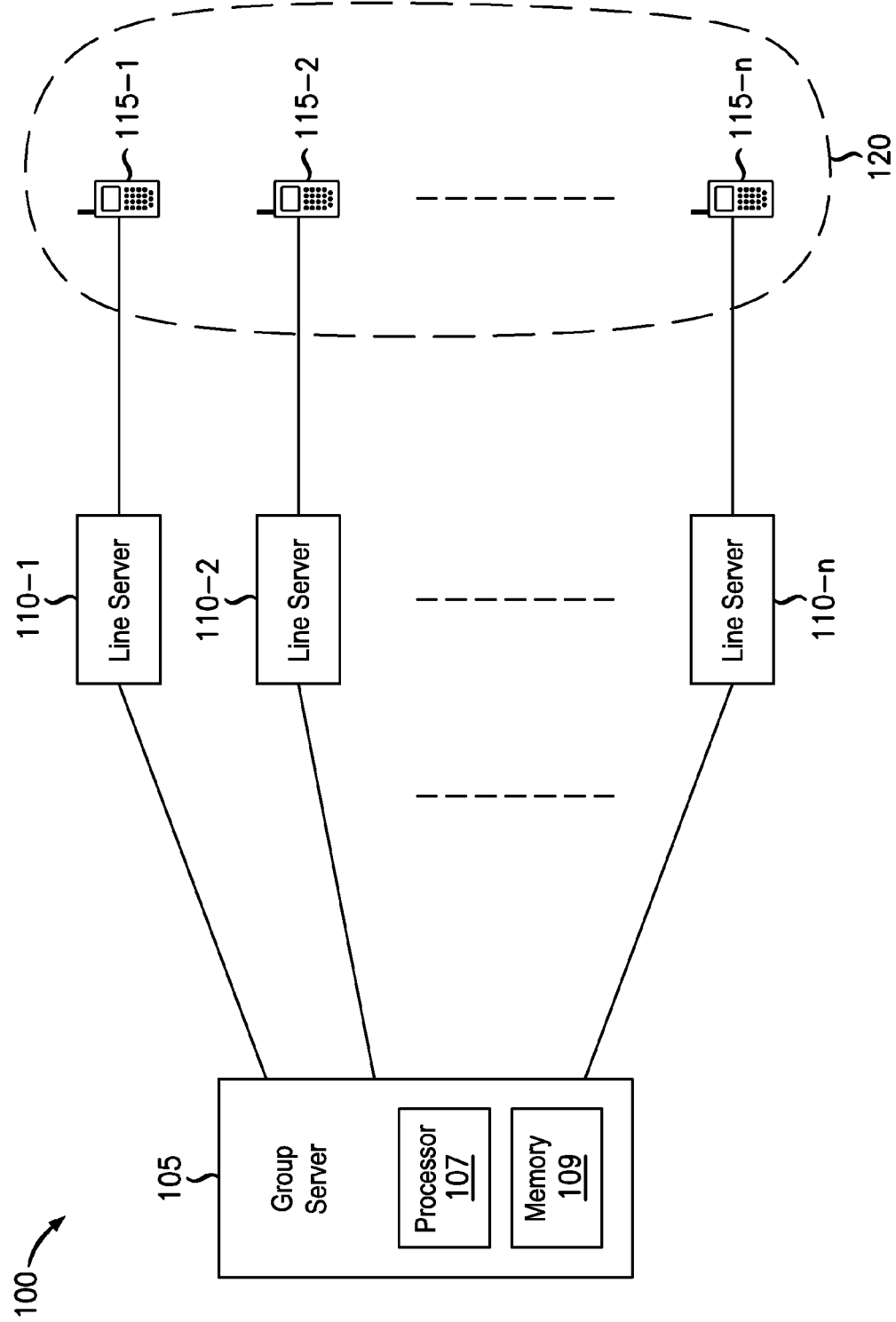
FIG. 1 depicts a system for monitoring and allocating data quotas to a group of lines subject to a pre-paid agreement, according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This disclosure may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged, and certain operations may be omitted or added to the process. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a non-transitory computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

FIG. 1 depicts a system for monitoring and allocating data quotas to a group of lines subject to a pre-paid agreement, according to an example embodiment. As illustrated in FIG. 1, the system 100 may include a group server (GS) 105, a plurality of line servers 110-1 to 110-$n$ and a plurality of lines 115-1 to 115-$n$, where n may depend on the number of lines that belong to a group of lines 120. The number of lines 115-1 to 115-$n$ in the group 120 may range from a few lines to thousands of lines.

The GS 105 may be configured to manage the group 120 and allocate data quotas to lines 115-1 to 115-$n$. The GS 105 may include a processor 107 and a memory 109. The processor 107 may be configured to execute a set of instructions stored in a non-transitory portion of the memory 109 of the GS 105, so as to implement the functions of the GS 105, as will be further described below with respect to FIGS. 2-3.

The GS 105, via the processor 107, may be configured to maintain a certain level of accuracy while allocating data quotas to the lines 115-1 to 115-$n$. In one example embodiment, the level of accuracy (hereinafter referred to as accuracy threshold) may represent a range within which the data quota usage by the group 120, as reported by the GS 105, is accurate. The accuracy threshold may be represented as a percentage of the allowed data quota for the group 120 and will be further described below.

The line servers 110-1 to 110-$n$ may also be referred to as Real-Time-Reporters (RTRs). Each of the line servers 110-1 to 110-$n$ may manage the data allocation or monitor the data quota usage by a corresponding one (or more) of the lines 115-1 to 115-$n$. Each of the line servers 110-1 to 110-$n$ may allocate data quotas to their corresponding one (or more) of the lines 115-1 to 115-$n$ according to instructions received from the GS 105.

The GS 105 and the RTRs 110-1 to 110-$n$ shown in FIG. 1 may be implemented is several ways. In one example embodiment, the RTRs may be implemented as virtual servers within the GS 105. In this example embodiment, the processor 107 may be suitably configured, via one or more instructions stored in the memory 109, to execute the functionality of the RTRs. Alternatively, the RTRs may be implemented in one or more external server devices that are communicatively interconnected to the group server.

The line servers 110-1 to 110-$n$ may communicate the allocated data quotas to the lines 115-1 to 115-$n$ via a router (e.g., P-gateway), not shown. Each router may serve one or more of the lines 115-1 to 115-$n$. In the alternative, each of the lines 115-1 to 115-$n$ may have a dedicated router. Furthermore, data quota requests by each of the lines 115-1 to 115-$n$ may be relayed to the corresponding one of the line servers 110-1 to 110-$n$. In the case where the line servers are implemented as virtual servers within the GS 105, the routers may communicate with the GS 105 to relay requested data quotas for the line(s) they may be servicing.

In one example embodiment, there may not be a single line server associated with each of the lines 115-1 to 115-$n$. Accordingly, a single line server may service two or more of the lines 115-1 to 115-$n$.

Communications between the GS 105 and the RTRs 110-1 to 110-$n$ may be based on Diameter protocol defined in IETF RFC 4006. Such communication may have signal overheads associated therewith. An example signaling overhead may be a Control Credit Request-update/Credit Control Answer-update (CCR-u/CCA-u) message. CCR-u/CCA/u may be a handshake initiated by a given one of the lines 115-1 to 115-$n$ requesting a new data quota allocation. It will be appreciated that the communication between the GS 105 and the RTRs 110-1 to 110-$n$ may not be limited to the Diameter protocol, and may include, for example, radius protocol and Lightweight Directly Access Protocol (LDAP).

At the time of purchasing the pre-paid data plan, the group 120 may get, for example, a group data quota, denoted as G that may be shared by the lines 115-1 to 115-$n$ in the group 120, until the group data quota G is used completely. However, for monitoring the consumption of the group data quota, at any given moment the overall outstanding data quota (e.g., data quota not yet reported by the lines 115-1 to 115-$n$ as being used) allocated to all the lines may be bounded by a percentage x of the group data quota G. In other words, in one example embodiment the overall outstanding data quota may be understood as $G*x$. This ensures that at any given time the actual data quota usage of a group is between RU and $RU+G*x$, where RU is the Reported Usage known to the GS 105. The described x may be the same as the accuracy threshold, described above. Examples of a typical value of x may be 2%, 5%, 10% etc., but the value of x is not limited thereto.

Figure 2:
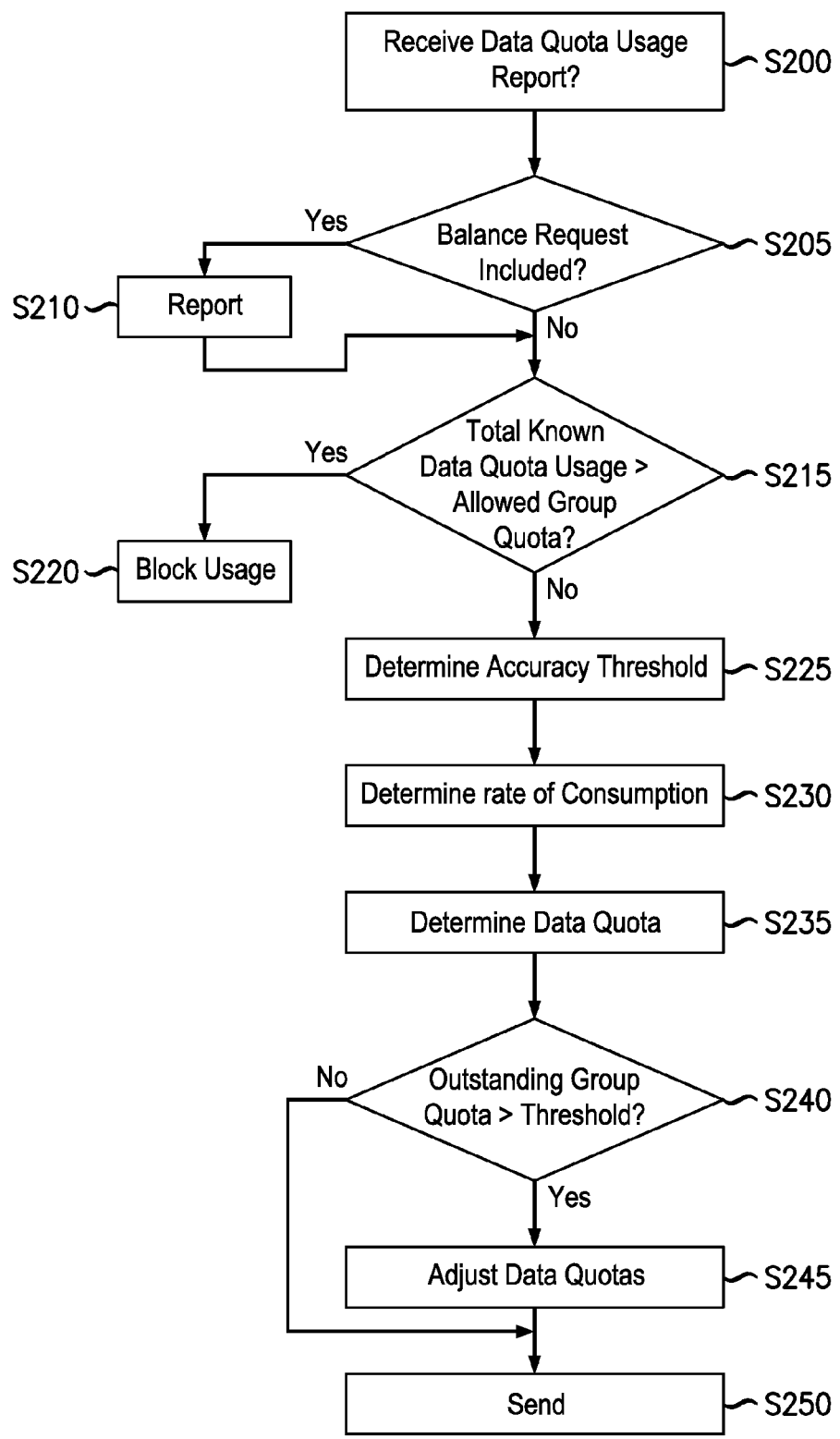
FIG. 2 describes a flowchart of a method for allocating data quotas to a group of lines subject to a pre-paid agreement, according to an example embodiment.

FIG. 2 describes a flowchart of a method for allocating data quotas to a group of lines subject to a pre-paid agreement, according to an example embodiment.

At S200, the GS 105 may receive a data quota usage report from one or more of a plurality of lines in a group such as one or more of the lines 115-1 to 115-$n$ in the group 120. At S205, the GS 105 determines whether the received data quota usage report includes a balance request. The balance request may be originated from the same line(s) sending the data quota usage report. The balance request may be a request for information on the unused portion of the data quota allocated the requesting line(s). The balance request may further include information on known data quota usage by the requesting line(s) (e.g., from the time of subscribing to the pre-paid data plan up to the time of requesting the balance by the requesting line(s) or from the time of last data quota allocation to the requesting line(s) up to the time of requesting the balance by the requesting line(s)). In one example embodiment, the balance request may further be a request for information on the unused portion of the group data quota allocated to the group. The balance request may further include information on known data quota usage by the group (e.g., from the time of subscribing to the pre-paid data plan by the group up to the time of requesting the balance).

If the GS 105 determines at S205 that the received data quota usage report includes balance request(s), at S210, the GS 105 may provide the requesting line with information related to the unused balance and/or known data quota usage by the requesting line(s) and/or the group. In one example embodiment, a requesting line may specifically request information on a balance and/or known data quota usage for the requesting line or that of the group. Accordingly, the GS 105 may only send the requested information. Thereafter, the process may proceed to S215, as will be described below.

In yet another example embodiment, the GS 105 may report to each line not only the outstanding balance/known data quota usage by the requesting line but also that of one or more of the remaining lines associated with the group. For example, when line 115-1 requests a balance, the GS 105 may respond to the request by not only providing the outstanding balance of line 115-1, but also of any one or more of the lines 115-2 to 115-n.

In one example embodiment, the GS 105 may further provide a meter of data quota usage by the requesting lines and/or other lines in the group when reporting the balance to the requesting line. The meter of data quota usage may provide a continuous indication of data quota usage and/or rate of data quota usage by one or more lines over a given period of time (e.g., past day, week, from the beginning of signing up for the pre-paid agreement, etc.).

In one example embodiment, when the GS 105 reports the balances to the requesting line(s), the GS 105 may also report respective accuracy thresholds associated with the balances. The accuracy thresholds may be the same as the accuracy threshold described above. For example, the accuracy threshold of 5% and the reported balance of 50% of the group quota G, may be interpreted as that the actual data quota usage by the lines in the group may be 5% more (or less) than the reported balance at the time of reporting.

In one example embodiment, the GS 105 may report balances to the requesting line(s) and/or all lines belonging to the group with a more precise range (e.g., with a 1% accuracy threshold as opposed to a 5% accuracy threshold) at certain milestones. For example, milestones may indicate that the reported data quota usage has reached 25% of the group data quota G, 50% of the group data quota G, 75% of the group data quota G, etc. Accordingly, at such milestones, the GS 105 may report that the corresponding percentage (e.g., 25%, 50%, 75%, etc.) or amount of the group data quota G has been consumed by the group with a more precise accuracy range as compared to other instances.

The accuracy threshold may be a volume based accuracy threshold, a time based accuracy threshold, or a combination thereof. The accuracy thresholds that have been so far described in the example embodiments above may be understood as volume-based accuracy threshold, as they are based on the reported data quota usage as a percentage of the group quota G. In another example embodiment, a time based accuracy threshold may represent a degree of accuracy of the balance report for a given period of time. For example, GS 105, when sending a balance report to the requesting line(s) may designate that the reported balance is accurate for a given time period (e.g., past 12 hours, past day, etc.). In yet another example embodiment, the accuracy threshold that may be reported to the line(s) and/or all lines in the group may include both the volume based accuracy threshold (e.g., margin of error in the reported data quota usage as a percentage of group quota G) and the time based accuracy threshold (within a period given period of time).

In one example embodiment, when the data quota usage is greater than one designated milestone and less than the next designated milestone at the time when the GS 105 receives a request from one or more lines, the GS 105 may report the previous milestone along with a time period associated with the last milestone. For example, assuming two milestones at 60% and 65%, if a line requests a balance when the group has used 62% of the group data quota, the GS 105 may send a volume based accuracy threshold along with the balance to the requesting line(s) (e.g., 62% with a 3% accuracy threshold) and/or send a time based accuracy threshold along with the last reported milestone (e.g., 60% of the group data quota was used as of 24 hours ago).

It will be appreciated that the example numerical values for the milestones, accuracy thresholds and time periods, provided throughout this disclosure, are for illustrative purpose only. Milestones, accuracy thresholds and time periods may take on any other value.

Referring back to FIG. 2, if at S205, the GS 105 determines that the received data quota usage report does not include any balance request, the process proceeds to S215. At S215, the GS 105 determines whether the total known data quota usage by the group exceeds the data quota G allocated to the group at the time of subscribing to the pre-paid plan. If at S215 the GS 105 determines that the known data quota usage by the group exceeds the allowed group quota, then at S220, the GS 105 may block any further data usage by the lines in the group 120. Thereafter, the process may end.

If at S215 the GS 105 determines that the known data quota usage by the group does not exceed the group data quota G, then at S225, the GS 105 may determine a desired accuracy threshold. The desired accuracy threshold may be, as described above, set to 2%, 5%, etc. However, the value of the accuracy threshold is not limited thereto. The accuracy threshold may be configured into the GS 105 by an operator of the system at the time of setting up the system 100. The accuracy threshold may be a reconfigurable variable that may be changed at any time, as desired. In one example embodiment, the accuracy threshold may be a reconfigurable variable that may be changed at any time based on a sum of outstanding data quotas allocated to the lines of a given group (e.g., lines 115-1 to 115-n)

At S230, the GS 105 may determine a rate of data quota consumption by the requesting line(s). For example, the GS 105 may determine such rate based on the amount of data quota allocated to a line and the time it takes the line to consume the allocated data quota (e.g., real-time rate of consumption of data quota by the requesting line(s)). Since the size of a data quota allocated to a requesting line at one instance of data quota allocation by the GS 105 may not be the same as the size of a data quota allocated to the requesting time at another instance of data quota allocation, the rates associated with each instance may be different. As a result, in one example embodiment, the GS 105 may determine the overall rate, as an average of different rates of consumption of data quotas over a relatively long period (e.g., rate of data quota consumption over a couple of pre-paid group data plans to which a particular line/user may have subscribed in the past or a rate of data quota consumption from the beginning of the current pre-paid plan up to the time of estimating the rate, etc.).

At S235, the GS 105 may determine a data quota for a line from which a data quota usage report was received at S200. In one example embodiment, the GS 105 may determine the data quota for the requesting line(s) as follows.

Upon receiving a data quota usage report from a requesting line, the GS 105 may update the known data quota usage by the lines in the group (e.g., lines 115-1 to 115-n in group 120). Let y denote the known data quota usage by the group as a percentage of the group quota G (e.g., 50% of G). Let r(i) denote the current estimate of how fast line i is consuming data quotas, where line i may be the requesting line. Furthermore, let F(y) denote a function based on which data quotas may be allocated to requesting lines. For example, F(y)=0.05 for y<0.5, F(y)=0.02 for 0.5<y<0.9 and F(y)=0.01 for y>0.9. Then, the GS 105 may allocate a new data quota to line i, upon receiving a data quota usage report from line i at S200, according to:

$$F(y)*r(i)/\Sigma_{j=1}^{n}r(j) \qquad (1)$$

where the sum in the denominator is over all the lines in the prepaid group (e.g., all lines 115-1 to 115-n in the group 120).

Once the GS 105 determines the data quota for the requesting line(s) at S235, then at S240, the GS 105 may determine whether the outstanding group quota is greater than a threshold for outstanding quota balance (the threshold may also be referred to as balance threshold). In one example embodiment, the threshold may be defined as T(y)=F(y)+0.02 for all y. Accordingly, the GS 105 may determine a sum of outstanding data quotas associated with lines of the group (e.g., lines 115-1 to 115-n of the group 120 shown in FIG. 1) and compare the determined sum to the threshold. The constant 0.02 (which may denote 2% of the group data quota G), may be a matter of design choice. The value of the threshold may also be determined based on empirical studies.

If at S240, the GS 105 determines that the outstanding group quota exceeds the threshold (e.g., T(y)), then at S245, the GS 105 may adjust/reallocate data quotas to all lines in the group 120. Such reallocation of data quotas may include reallocating data quotas to all lines including lines from which no data quota usage report was received at S200. In one example embodiment, upon the outstanding data quota being greater than threshold, the GS 105 may lower the data quota determined at S235 as well as the data quotas for all the remaining lines in the group.

However, if the GS 105, at S240 determines that the outstanding group quota is not greater than the threshold, the process may proceed to S250. At S250, the GS 105 may send the determined data quota to the requesting line(s) or send adjusted or reallocated data quotas to all lines of the group depending on whether the outstanding group quota is determined to be greater than the threshold at S240 or not.

Figure 3:
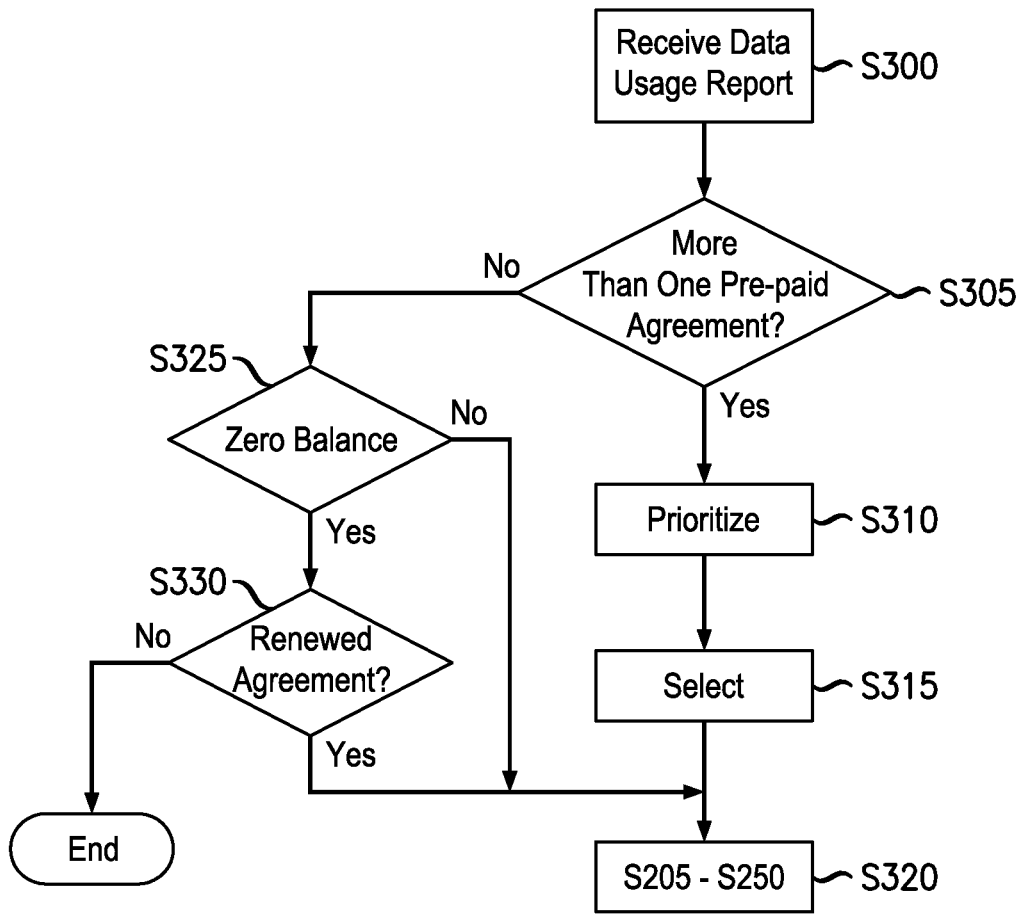
FIG. 3 describes a flowchart of a method for allocating data quotas to a group of lines subject to more than one pre-paid agreement, according to an example embodiment.

FIG. 3 describes a flowchart of a method for allocating data quotas to a group of lines subject to more than one pre-paid agreement, according to an example embodiment. At S300, the GS 105 may receive a data quota usage report from one or more of a plurality of lines in a group (e.g., one or more of lines 115-1 to 115-n in the group 120).

At S305, the GS 105 may determine whether the group (e.g., the group 120), may be associated with more than one pre-paid agreement. If the GS 105 determines that the group is associated with more than one pre-paid agreement, the GS 105 may prioritize the pre-paid agreements. The prioritization may be based on any one of, but not limited to, the group balance, the outstanding data quota for the group for each agreement, roaming charges, promotions associated with each pre-paid agreement, etc.

At S315, the GS 105 may select one of the pre-paid agreements based on the prioritization at S310. Accordingly, data quota usage reporting or allocation of data quotas to the lines in the group may be carried out for the selected one of the pre-paid agreements. Thereafter the process may proceed to S320 where the GS 105 may implement the functions described above with reference to S205 to S250 of FIG. 2.

However, if at S305, the GS 105 determines that the group is associated with only one pre-paid agreement, then at S325 the GS 105 determines whether the group balance according to the pre-paid agreement is zero. If at S325, the GS 105 determines that the group balance is not zero, then the process may revert back to S320, where GS 105 may implement the functions described above with reference to S205-S250 of FIG. 2.

However, if at S325, the GS 105 determines that the group balance is zero, then at S330, the GS 105 may determine whether the group has renewed its pre-paid agreement. If at S330, the GS 105 determines that the group has renewed its pre-paid agreement, then the process may revert back to S320, where GS 105 may implement the functions described above with reference to S205-S250 of FIG. 2.

In one example embodiment, at the time of signing up for a pre-paid agreement, the group representative or coordinator may choose an option according to which each line of the group may be guaranteed an initial minimum data quota when a pre-paid agreement is renewed. In other words, when a group subjects itself to a pre-paid agreement or when the group renews its pre-paid agreement, each line in the group may be allocated a data quota that is at least equal to the initial minimum data quota allocated to each line of the group. In one example embodiment, the initial minimum data quota may be the same for all lines in the group or each line may be allocated a different size initial minimum data quota, depending on, for example, past usage history of each line. Accordingly, the GS 105 may determine the data quota for the requesting line based on the received data quota usage, the accuracy threshold determines at S225 of FIG. 2, the rate of consumption determined at S230 of FIG. 2 and the determined initial minimum data quota.

However, if at S330, the GS 105 determines that the group has not renewed its pre-paid agreement, the process may end at S335.

Variations of the example embodiments are not to be regarded as a departure from the spirit and scope of the example embodiments, and all such variations as would be apparent to one skilled in the art are intended to be included within the scope of this disclosure.

What is claimed:

1. A group server comprising:
 a processor configured to,
  receive a data quota usage report corresponding to data quota usage by at least one of a plurality of lines, the plurality of lines forming a group subject to a pre-paid data usage agreement with a data service provider; and
  determine a data quota for the at least one of the plurality of lines based on at least the received data quota usage report and an accuracy threshold, the accuracy threshold being at least one of,
   an accuracy range associated with a reported data quota usage by the group, and
   a time period in which the reported data quota usage is accurate.

2. The group server of claim 1, wherein the processor is further configured to report at least one of,
 a line specific balance to the at least one of the plurality of lines, the line specific balance being at least one of an unused portion of the determined data quota for the at least one of the plurality of lines and data quota consumed by the at least one of the plurality of lines, and
 a group quota balance to the at least one of the plurality of lines, the group quota balance being at least one of an unused portion of a group data quota associated with the group and data quota consumed by the group.

3. The group server of claim 2, wherein the processor is further configured to provide an indication of a continuing data quota usage by the at least one of the plurality of lines to one or more of the plurality of lines of the group.

4. The group server of claim 1, wherein the processor is further configured to,
  block data usage by the plurality of lines when a total data quota usage associated with the group exceeds an allowed data quota for the group, and
  report the block of the data usage to the plurality of lines.

5. The group server of claim 1, wherein the processor is further configured to determine the data quota based on the received data quota usage report, the accuracy threshold and a rate of consumption of data quota by the at least one of the plurality of lines.

6. The group server of claim 5, wherein the processor is further configured to estimate the rate of consumption based on at least one of a real-time rate of consumption of data quota associated with the at least one of the plurality of lines or an average rate of consumption of data quota associated with the at least one of the plurality of lines.

7. The group server of claim 1, wherein the processor is further configured to,
  determine a sum of data quotas allocated to the plurality of lines;
  determine whether the determined sum has exceeded a balance threshold; and
  determine a new data quota for the plurality of lines if the determined sum has exceeded the balance threshold.

8. The group server of claim 1, wherein the processor is further configured to determine the data quota for the at least one of the plurality of lines based on the received data quota usage report, the accuracy threshold and a minimum new data quota.

9. The group server of claim 1, wherein the group is subjected to multiple pre-paid data usage agreements; and
  the processor is configured to prioritize the multiple pre-paid data usage agreements based on at least one of an expiration of each of the multiple pre-paid data usage agreements and a promotion associated with each of the multiple pre-paid data usage agreements.

10. A method comprising:
  receiving, by a processor, a data quota usage report corresponding to data quota usage by at least one of a plurality of lines, the plurality of lines forming a group subject to a pre-paid data usage agreement with a data service provider; and
  determining, by the processor, a data quota for the at least one of the plurality of lines based on at least the received data quota usage report and an accuracy threshold, the accuracy threshold being at least one of,
  an accuracy range associated with a reported data quota usage by the group, and
  a time period in which the reported data quota usage is accurate.

11. The method of claim 10, further comprising at least one of:
  reporting a line specific balance to the at least one of the plurality of lines, the line specific balance being at least one of an unused portion of the data quota determined for the at least one of the plurality of lines and data quota consumed by the at least one of the plurality of lines, and
  reporting a group balance to the at least one of the plurality of lines, the group balance being at least one of an unused portion of a group data quota associated with the group and data quota consumed by the group.

12. The method of claim 11, wherein the reporting provides an indication of a continuing data quota usage by the at least one of the plurality of lines to one or more of the plurality of lines of the group.

13. The method of claim 10, further comprising:
  blocking data usage by the plurality of lines when a total data quota usage associated with the group exceeds an allowed data quota for the group, and
  reporting the blocking of the data usage to the plurality of lines.

14. The method of claim 10, wherein the determining determines the data quota based on the received data quota usage report, the accuracy threshold and a rate of consumption of data quota by the at least one of the plurality of lines.

15. The method of claim 14, further comprising:
  estimating the rate of consumption based on at least one of a real-time rate of consumption of data quota associated with the at least one of the plurality of lines and an average rate of consumption of data quota associated with the at least one of the plurality of lines.

16. The method of claim 10, further comprising:
  determining a sum of data quotas allocated to the plurality of lines;
  determining whether the determined sum has exceeded a balance threshold; and
  determining a new data quota for the plurality of lines if the determined sum has exceeded the balance threshold.

17. The method of claim 10, wherein the determining determines the data quota for the at least one of the plurality of lines based on the received data quota usage report, the accuracy threshold and a minimum new data quota.

18. The method of claim 10, wherein upon the group being subjected to multiple pre-paid data usage agreements, the method further comprises:
  prioritizing the multiple pre-paid data usage agreements based on at least one of an expiration of each of the multiple pre-paid data usage agreements and a promotion associated with each of the multiple pre-paid data usage agreements.

* * * * *